Sept. 15, 1964 T. G. GRANRYD ETAL 3,148,792
TRACTOR LOADERS
Filed Feb. 19, 1962 8 Sheets-Sheet 1

INVENTORS.
Thorvald G. Granryd
Arthur L. Collins
Paul O. Pippel
Atty.

Sept. 15, 1964     T. G. GRANRYD ETAL     3,148,792
TRACTOR LOADERS

Filed Feb. 19, 1962            8 Sheets-Sheet 2

Fig. 2.

INVENTORS.
Thorvald G. Granryd
Arthur L. Collins
Paul O. Pippel
Atty.

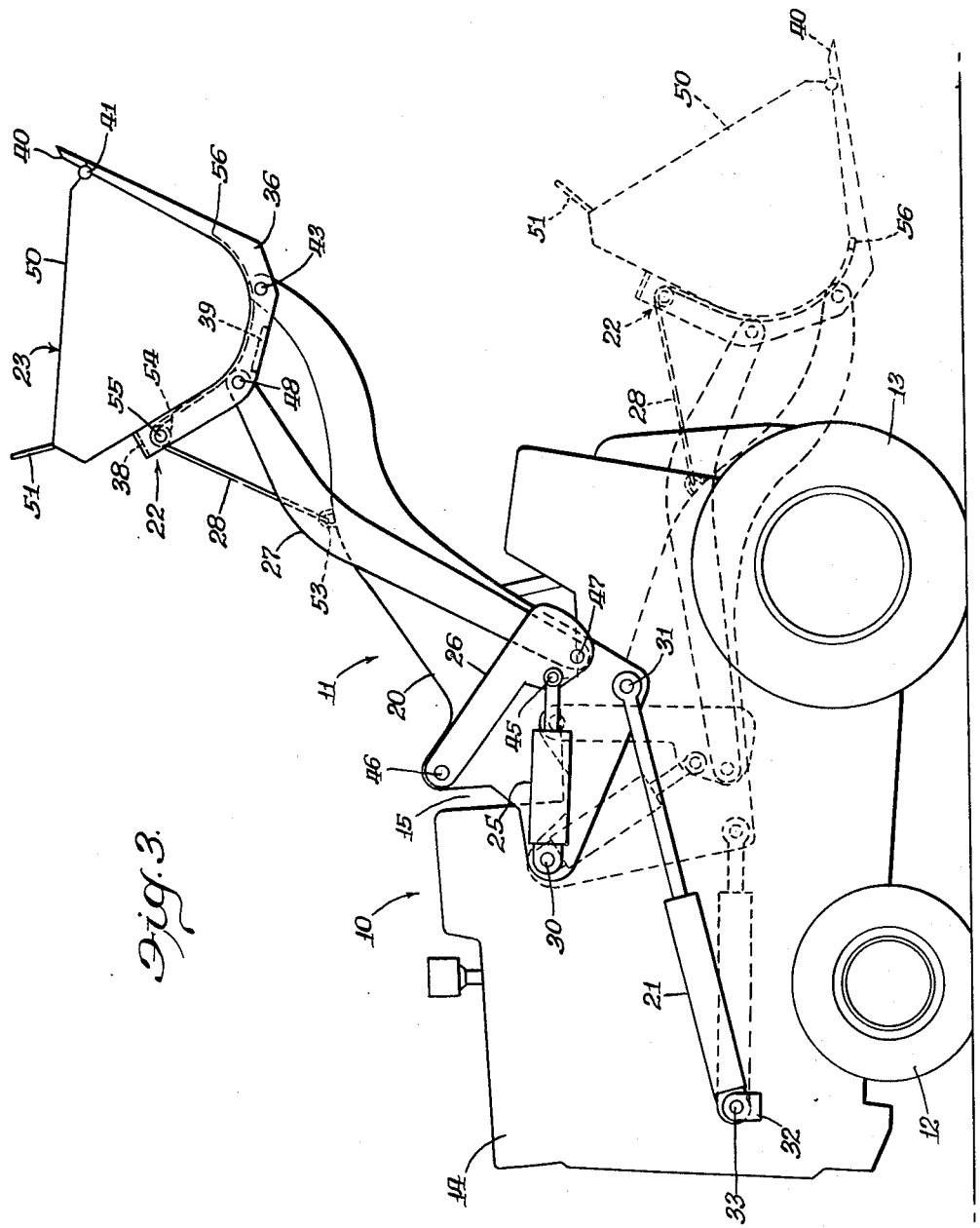

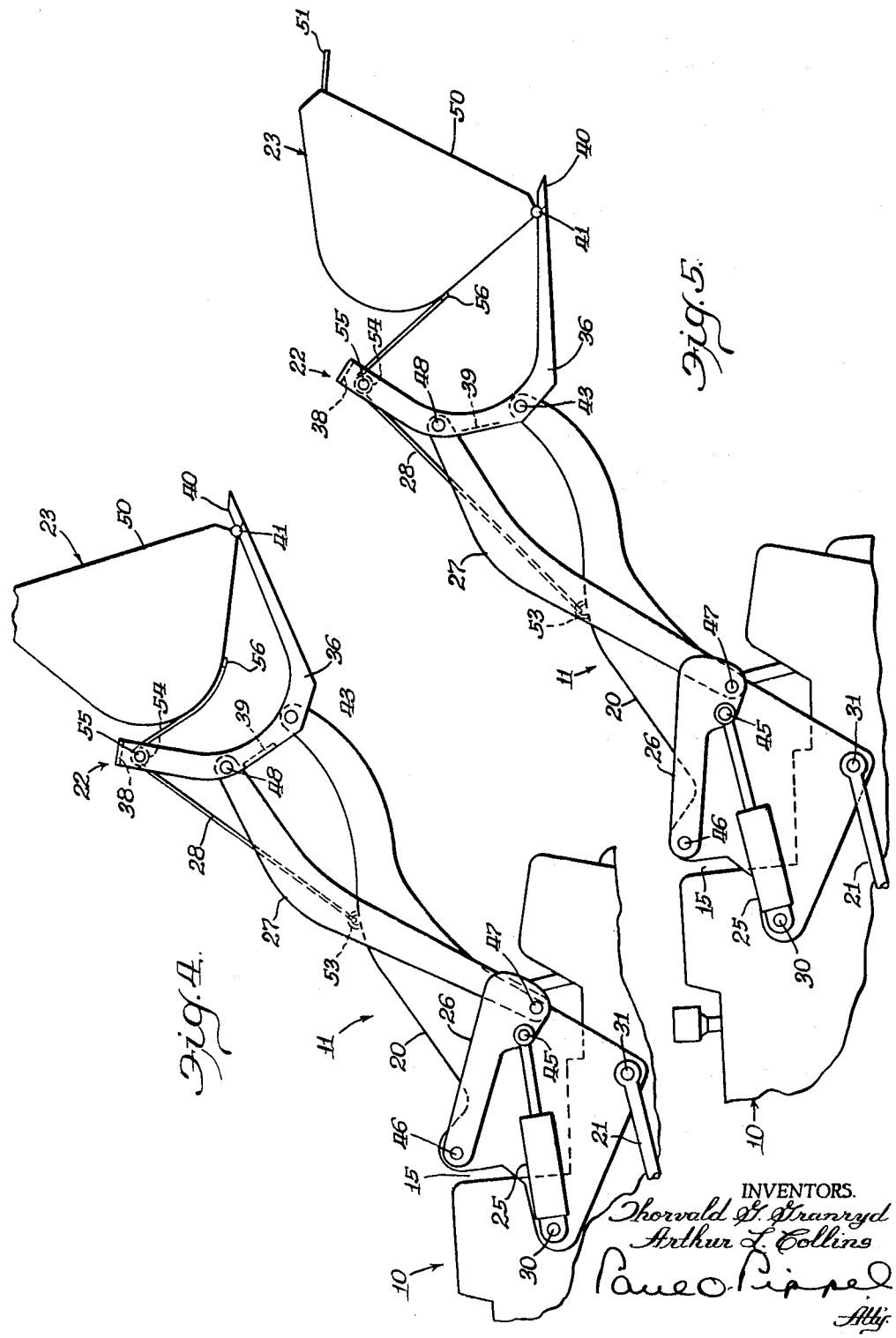

Sept. 15, 1964     T. G. GRANRYD ETAL     3,148,792
TRACTOR LOADERS
Filed Feb. 19, 1962     8 Sheets-Sheet 5
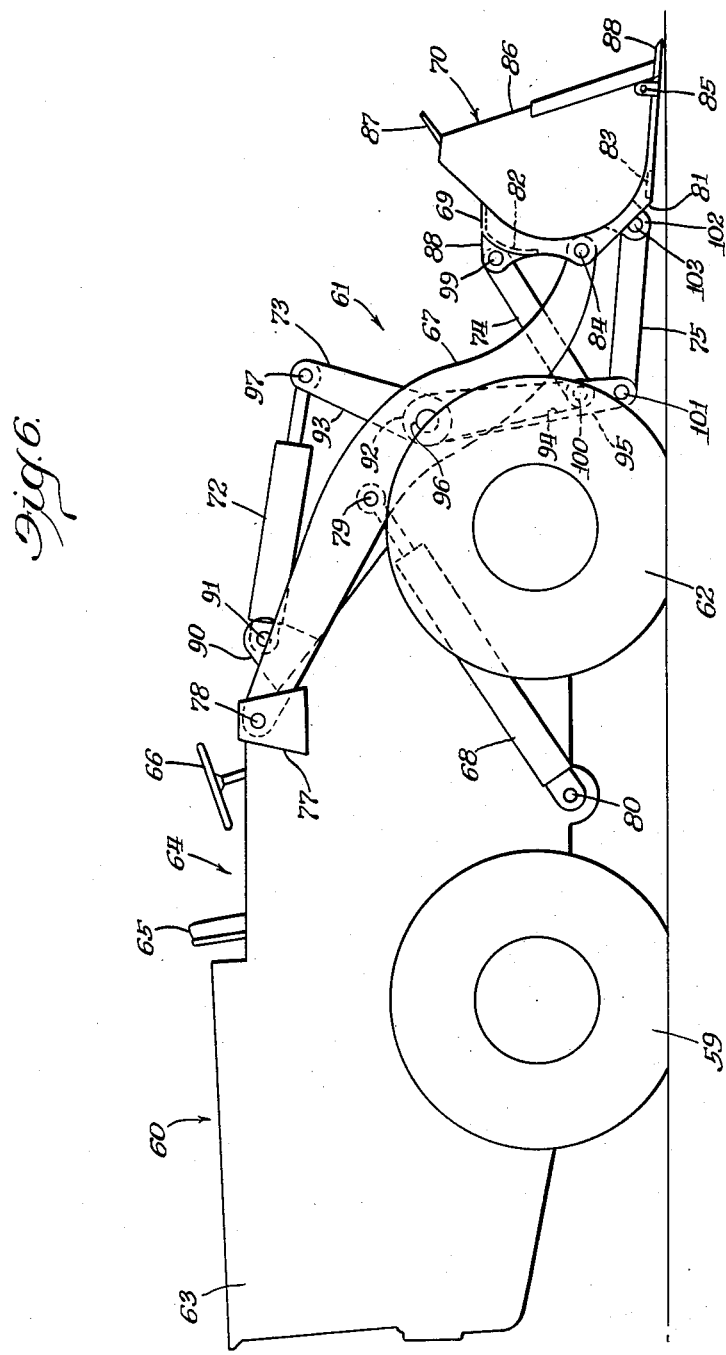
INVENTORS.
Thorvald G. Granryd
Arthur L. Collins
Paul O. Pippel
Atty.

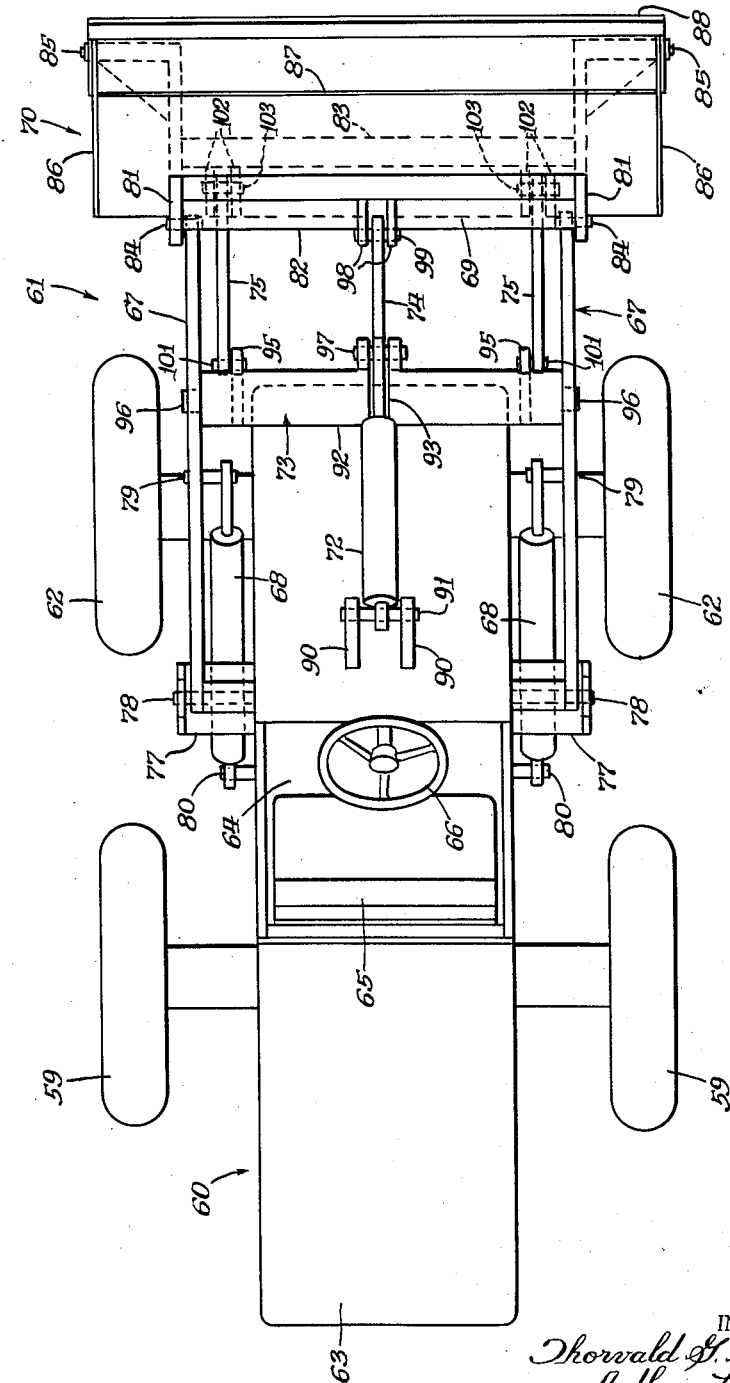

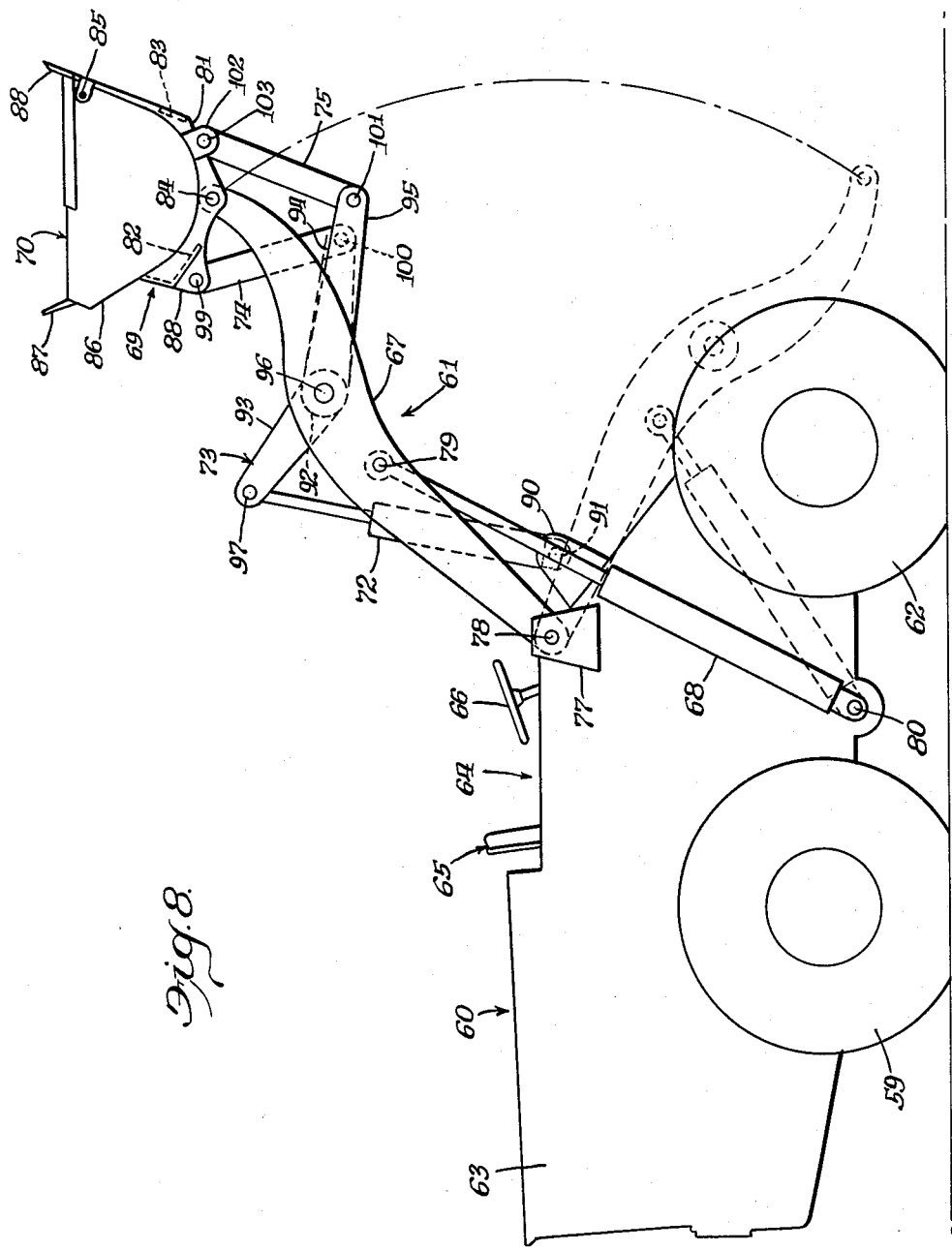

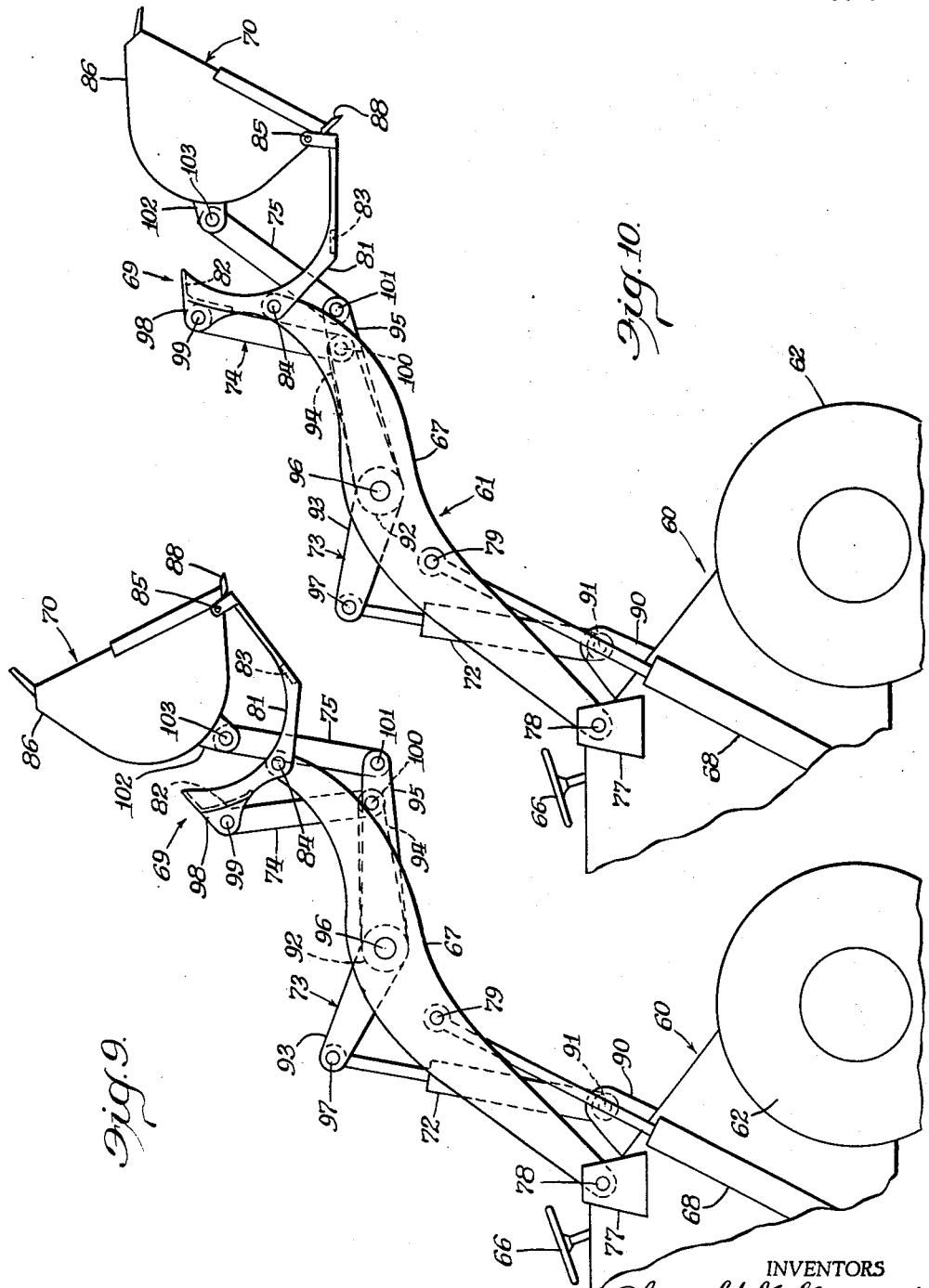

United States Patent Office 3,148,792
Patented Sept. 15, 1964

3,148,792
TRACTOR LOADERS
Thorvald G. Granryd and Arthur L. Collins, Libertyville, Ill., assignors to The Frank G. Hough Co., a corporation of Illinois
Filed Feb. 19, 1962, Ser. No. 174,149
10 Claims. (Cl. 214—140)

This invention relates generally to tractor loaders, and more particularly to a novel high dumping loader arrangement for a front-end type tractor loader.

The primary object of the present invention is to provide a novel loader arrangement for a front-end type tractor loader which will provide for dumping of the bucket at substantial heights.

It is another object to provide a novel loader arrangement for a front-end type tractor loader wherein the overall length of the tractor loader is maintained at a minimum in the digging and the carrying operations relative to the dumping height and reach achieved in the dumping of the bucket from the high lift position.

It is a further object to provide novel means in a loader arrangement for a front-end type tractor loader for multiplying the range of movement of the bucket tilting ram to provide substantial reach and overturning of the bucket in the high lift dump position thereof.

It is still another object to provide a novel loader arrangement for a front-end type tractor loader in which the bucket is pivotable rearwardly to an upwardly opening position for convenient carrying of the loaded bucket when the bucket is raised from the ground level digging position, and wherein novel motion multiplying means is provided to produce a substantial pivoting of the bucket to a dump position at a substantial height above the ground.

It is still another object to provide a novel loader arrangement for a front-end type tractor loader wherein the loader arrangement comprises a bucket, bucket carrier, and dumping means for contemporaneously pivoting the bucket and the bucket carrier to achieve dumping of the bucket with substantial reach and at substantial heights above the ground.

Other objects and features of the invention will be apparent upon a perusal of the following specification and drawings in which:

FIGURE 2 is a top plan view of the structure shown in FIGURE 1;

FIGURE 3 is a side elevational view of a tractor loader such as shown in FIGURE 1 but with the bucket raised to the high lift position;

FIGURE 4 is a partial view of the structure shown in FIGURE 3, but with the bucket partially dumped;

FIGURE 5 is a view similar to FIGURE 4 but with the bucket completely dumped;

FIGURE 6 is a side elevational view of another embodiment of a tractor loader constructed according to the invention;

FIGURE 7 is a top plan view of the structure shown in FIGURE 6;

FIGURE 8 is a side elevational view of a tractor loader according to FIGURE 6 but with the bucket raised to high lift position;

FIGURE 9 is a partial view of the structure shown in FIGURE 8 but with the bucket partially dumped; and FIGURE 10 is a view similar to FIGURE 9 but with the bucket completely dumped.

Figure 1:
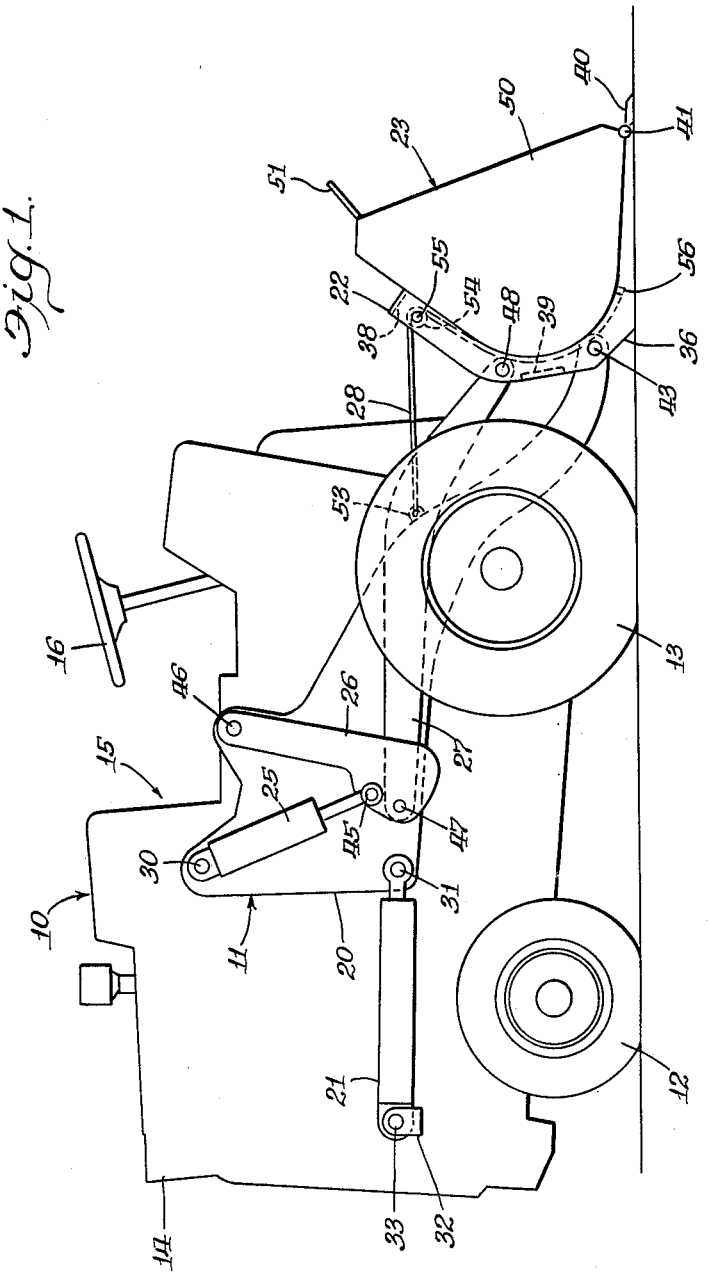
FIGURE 1 is a side elevational view of one embodiment of a tractor loader constructed according to the invention.

The present embodiments are the preferred embodiments, but it is to be understood that changes can be made in the present embodiments by one skilled in the art without departing from the spirit and scope of the present invention.

Generally, the tractor loader of the present invention comprises a four-wheel, rubber tired tractor with the loader arrangement carried on the forward end of the tractor and extending generally forwardly thereof. The present invention may be applied to other types of tractors such as crawler tractors.

The loader arrangement comprises a boom, a bucket carrier, a bucket, and linkage means. The boom is pivotally connected to the tractor and extends forwardly thereof. The bucket carrier is pivotally connected to the forward end of the boom. The bucket is pivotally connected at the forward marginal edge of the bottom wall thereof to the forward end of the bucket carrier. The linkage means is pivotally connected between the tractor, the boom, the bucket, and the bucket carrier. In the first embodiment of the invention, the linkage means on each side of the tractor comprises a pair of levers, a reciprocating hydraulic motor and a cable. The pair of levers are pivotally interconnected at one end of each thereof, and the other end of one lever is pivotally connected to the boom intermediate the ends thereof, while the other end of the other lever is pivotally connected to the bucket carrier. The reciprocating hydraulic ram is pivotally carried on the same pin means that carries the boom on the tractor, and the ram is pivotally connected to one of the levers. The cable is connected at one end thereof to the boom intermediate the ends thereof, and after passing over a pulley carried by the bucket carrier is connected to the underside of the bucket. When the boom is lowered to ground level and the reciprocating hydraulic ram of the linkage means is substantially retracted, the bucket is positioned in the ground level digging position such as shown in FIGURE 1. If the boom is then raised to the high lift position shown in FIGURE 3 without any operation of the reciprocating hydraulic motor of the linkage means, the bucket and carrier will be positioned with the open side of the bucket disposed substantially upwardly, as in FIGURE 3. FIGURES 4 and 5 show the movement of the bucket to the dump position from the high lift carrying position of FIGURE 3, by a partial extension of the reciprocating hydraulic motor in FIGURE 4, and a complete extension of the hydraulic motor in FIGURE 5. It may be seen from the drawings that as the reciprocating hydraulic motor is extended, two operations occur contemporaneously; firstly, the carrier is caused to pivot downwardly, and secondly, the bucket is caused to pivot relative to the carrier. The bucket pivoting is caused by the lifting force applied to the bucket by the cable.

The linkage means of the second embodiment of the invention comprises a lever assembly pivotally carried on the boom intermediate the ends thereof, a reciprocating hydraulic ram and a number of links. The lever assembly, which is pivotally carried by the boom between the arms thereof, is provided with one lever arm which extends generally upwardly, a second lever arm which extends generally downwardly and a pair of third lever arms which also extend generally downwardly. The upwardly extending lever arm is pivotally connected to one end of the reciprocating hydraulic motor and the other end of the reciprocating hydraulic motor is pivotally connected to the tractor. The second lever arm is pivotally connected through one of the links to the bucket carrier. The pair of third lever arms is pivotally connected through the other links to the underside of the bucket. When the reciprocating hydraulic ram is substantially extended and the boom is in its lowermost position, the bucket is in the ground level digging position shown in FIGURE 7. If the boom is then raised to the high lift position shown in FIGURE 8, with a complete extension of the reciprocating hydraulic ram, the bucket and carrier will be positioned as shown therein with the open side of the bucket disposed substantially upwardly. FIGURES 9 and 10 show the movement of the bucket carrier and bucket when the reciprocating hydraulic motor is retracted. In FIGURE 9, the reciprocating hydraulic ram is partially retracted and it may be seen therein that the carrier has been partially pivoted to lower the forward end thereof and the bucket has been partially pivoted toward the dump position relative to the carrier. In FIGURE 9, with a substantially complete retraction of the reciprocating hydraulic ram, the extending arms of the bucket carrier are substantially horizontal, and the bucket has been pivoted to the dump position relative to the bucket carrier.

It thus may be seen from the drawings of both embodiments of the invention that the movement of the bucket to the dump position relative to the ground is a combination of two pivotal movements, one of the carrier relative to the boom and the second of the bucket relative to the carrier. These arrangements provide for an excellent overturning or dumping of the bucket at substantial dumping heights. In neither embodiment of the invention does the forward end of the bucket carrier drop to a downwardly disposed position when the bucket is completely dumped. In both embodiments, the forward end of the bucket carrier is disposed substantially horizontally in the dumped position of the bucket. This feature of both embodiments provides for excellent reach of the bucket in the dumped position without the penalty of having a tractor loader which is excessively long in overall length in the digging or carrying positions of the bucket.

A further feature of the invention is that the reciprocating hydraulic motor of the linkage means need not have an excessively long stroke because for a unit operation of the hydraulic ram there occurs a certain pivoting of the bucket carrier toward the dump position plus a certain pivoting of the bucket toward the dump position.

An additional feature of the present invention is a relatively fast dumping time of the bucket which is due to the fact that the pivotal movements of the carrier relative to the boom and the bucket relative to the carrier occur contemporaneously. The converse of the latter feature is an additional feature, and that is the rapid return of the bucket from the extreme dumped position to the carrying position from which the bucket is automatically positioned in the ground level digging position when the boom is lowered to ground level.

In detail, the first embodiment of the invention comprises a tractor 10 and a loader 11 operatively carried on the tractor and extending forwardly thereof. The tractor 10 is of the four-wheeled, rubber tired type having rearward wheels 12 and forward wheels 13. An engine compartment 14 is carried at the rearward end of the tractor and an operator's compartment 15 is disposed forwardly of the engine compartment 14. The steering wheel 16 is carried in the operator's compartment 15.

The loader 11 comprises a boom 20, a boom hydraulic ram 21, a bucket carrier 22, a digging bucket 23 and certain linkage means. The linkage means comprises a bucket tilting reciprocating hydraulic ram 25, a lever 26, a lever 27 and a wire cable 28. The boom 20, the boom ram 21 and the linkage means are formed in duplicate portions disposed one on each side of the tractor 10 and connected to the bucket carrier 22 and the bucket 23. In the following description, it will suffice to merely describe the duplicate members disposed on one side of the tractor 10.

The rearward end of the boom 20 is pivotally connected to the tractor 10 by pin means 30. The other end of the boom extends forwardly of the tractor 10. The rearward portion of the boom 20 is formed as a relatively wide plate. The forward end of the boom 20 is raised and lowered by the boom hydraulic ram 21 which is pivotally connected at its rod end to the plate portion of the boom 20 by pin means 31 at a position substantially vertically below pin means 30.

The head end of the hydraulic ram 21 is pivotally connected to a bracket 32 by pin means 33. The bracket 32 is secured to the side of the tractor 10 at the rearward end thereof at a position such that when the hydraulic ram 21 is substantially retracted, the hydraulic ram 21 is substantially horizontally disposed and the forward end of the boom 20 is in its lowermost position.

The bucket carrier 22 is generally L-shaped and is constructed of a number of members which form a substantially open frame. The bucket carrier 22 need not have the particular frame construction hereinafter described but may be made in other forms suitable for the necessary functions of the bucket carrier 22. The bucket carrier 22 of the first embodiment comprises a pair of L-shaped members 36 and a second pair of substantially identically shaped members 37 which are positioned between the members 36 in a spaced relationship therefrom as may be seen in FIGURE 2. A brace member 38 is secured to the upper ends of the members 36 and 37 by any means such as welding. The members 37 are further braced by a member 39 secured therebetween, and the lower forward end of the members 36 and 37 of the bucket carrier 22 are interconnected by a cutting edge 40. Other bracing members may be used between the members 36 and 37 to provide a rigid open frame construction for the bucket carrier 22. The bucket carrier 22 is further provided with hinge means 41 positioned transversely of the carrier 22 immediately rearwardly of the cutting edge 40 for hingedly connecting the bucket 23 thereto. The lower rearward portion of the bucket carrier 22 is pivotally connected to the forward end of each portion of the boom 20 by pin means 43. The forward end of each portion of the boom 20 extends between one of the members 36 and one of the members 37, and the pin means 43 is inserted through suitable openings in the members 36 and 37 and the forward end of the boom 20.

One function of the linkage means is to control the pivotal position of the bucket carrier 22 relative to the boom. The reciprocating hydraulic ram 25 of the linkage means, commonly called a bucket tilting ram, is pivotally connected at its head end to the tractor 10 by pivotal mounting means 30. Thus it may be seen that the head end of the bucket tilting ram 25 is pivotable relative to the tractor about the same axis as the rearward end of the boom 20. The rod end of the hydraulic ram 25 is pivotally connected to the lever 26 intermediate the ends thereof by pin means 45. The upper end of the lever 26 is pivotally connected to the plate portion of the boom 20 by pin means 46. Pin means 46 is positioned on the plate portion of the boom substantially forwardly of pin means 30. Although the pin means 45 is positioned intermediate the ends of the lever 26, it is positioned substantially adjacent to the lower end of lever 26. The lower end of lever 26 is pivotally connected to one end of the lever 27 by pin means 47. The other end of lever 27 extends forwardly of the tractor 10 and between one of the members 36 and one of the members 37 of the bucket carrier 22. The forward end of the lever 27 is pivotally connected to the bucket carrier 22 by pin means 48 which is journaled through the members 36 and 37 substantially vertically above pin means 43 which pivotally connects the boom 20 to the carrier 22. The various members of the linkage means are of such a size and are so positioned that when the boom is in the lowermost position as shown in FIGURE 1, and when the hydraulic ram 25 is substantially retracted, the forwardly extending portion of the bucket carrier 22 is disposed substantially horizontally at ground level, and further so that when the boom is in the high lift position such as shown in FIGURES 3, 4 and 5, the forwardly extending portion of the bucket carrier 22 again is substantially horizontally disposed when the hydraulic ram 26 is substantially completely extended as in FIGURE 5. When the boom 20 is raised with the carrier 22 positioned as in FIGURE 1, the carrier 22 will be pivoted rearwardly relative to the horizontal to a position such as shown in FIGURE 3 in the high lift position of the boom 20. The position of the bucket carrier 22 relative to the boom 20 or relative to the horizontal as shown in FIGURE 4 is the result of a partial extension of the hydraulic ram 25. It may be seen from a comparison of FIGURES 3, 4 and 5 that the bucket carrier position of FIGURE 4 is about halfway between the positions of FIGURES 3 and 5.

The bucket 23 is of substantially any suitable shape and construction known in the art but is without an integrally carried cutting edge, the cutting edge 40 of the carrier 22 serving as the cutting edge for the bucket 23. The bucket 23 comprises a pair of spaced apart side walls 50 interconnected by a curved plate 51 which forms the top, rear, and bottom walls of the bucket 23. The curvature of the plate 51 substantially conforms to the curvature of the carrier 22 so that the bucket 23 is supportable by the carrier 22 substantially as shown in FIGURE 1. The forward marginal edge of the bottom wall of the bucket 23 is formed to carry part of the hinge means 41 so that the bucket 23 is pivotally connected to the carrier 22 for pivotal movement about a transversely disposed axis immediately rearwardly of the cutting edge 40.

The pivotal position of the bucket 23 relative to the carrier 22 is controlled by the linkage means including the cable 28 and the force of gravity. One end of the cable 28 is secured to the boom 20 intermediate the ends thereof by a hookeye 53. From the hookeye 53, the cable 28 proceeds forwardly, over, and thence downwardly of a pulley 54. The pulley 54 is pivotally carried between one of the members 37 and one of the members 36 of the bucket carrier 22 substantially at the upper end thereof by pin means 55. The cable 28 after proceeding downwardly from the pulley 54 passes over the rear wall of the bucket in a downward direction to an anchor 56 on the bottom wall of the bucket 23. The pulley 54 is caused to act against the cable 28 to lift the rearward end of the bucket 23 sufficiently to cause the bucket 23 to be moved to the dump position by virtue of the various angles which the bucket carrier 22 assumes relative to the boom 20. The various angles of the carrier 22 relative to the boom 20 are clearly shown in the drawings. It may be seen in FIGURES 1 and 3 that the distance between the pulley 54 and a line drawn between the hookeye 53 and hinge means 41 is of a certain distance, which is substantially the same in both views. This distance is less than the distance between the pulley 54 and the drawn line in FIGURE 4, and the noted distance in FIGURE 4 is less than that distance as measured in FIGURE 5. With pin means 43 at the apex of an angle extending from pin means 43 to hookeye 53 and from pin means 43 to pulley 54, it may be seen that that angle in FIGURE 1 is an acute angle. In FIGURE 4 that angle is substantially a right angle, and in FIGURE 5 that angle becomes an obtuse angle as the center of gravity of any load in the bucket 23 moves forwardly of hinge means 41 to cause a dumping of any load within the bucket 23. The speed of the bucket in dumping from the position of FIGURE 3 through that of FIGURE 4 to that of FIGURE 5 rapidly increases, so that the bucket 23 virtually snaps into the dumped position of FIGURE 5. When the bucket is empty in the dumped position of FIGURE 5, the center of gravity of the empty bucket is rearwardly of the hinge means 41, and therefore the empty bucket has a tendency to return toward the carrier 22 under the influence of gravity. As the boom 20 is lowered by a retraction of hydraulic ram 21, the bucket 23 will be lowered by the cable 28 onto the bucket carrier 22, with the center of gravity of the bucket 23 moving further and further rearwardly of hinge means 41. When the boom 20 has been returned to the position shown in FIGURE 1, the bucket 23 will again be fully returned to the position shown in FIGURE 1.

From the foregoing it may be seen that when the boom 20 is in the high lift position shown in FIGURE 3, the extension of the hydraulic ram 25 causes the forward end of the carrier 22 to be pivoted downwardly, and further, contemporaneously causes the bucket 23 to be pivoted relative to the carrier 22 to carry a loaded bucket 23 to the substantially overturned or dumped position shown in FIGURE 5. From a comparison of the dotted line and solid line positions of the loader shown in FIGURE 3, it may be seen that in the digging and carrying functions of the tractor loader, the overall length of the tractor loader is maintained relatively short with the bucket and any load therein being carried close to the forward end of the tractor. From a consideration of FIGURE 5 it may be seen that the reach of the tractor loader in the high lift dumped position of the bucket is substantially increased so that dumping into the center or far side of a dump truck or bin is easily accomplished while additionally providing a relatively high dumping height for the bucket. Additionally the acceleration of the bucket 23 in dumping produces a self-cleaning feature which is manifest by a tendency of the bucket 23 to jar sticky materials from within the confines of the bucket 23.

In detail the second embodiment of the invention comprises a tractor 60 and a loader 61 operatively carried on the tractor and extending forwardly thereof. The tractor 60 which is generally of a larger size than the tractor 10 of the first embodiment, is also of the four-wheeled, rubber tired type having rearward wheels 59 and forward wheels 62. An engine compartment 63 is carried at the rearward end of the tractor and an operator's compartment 64 is disposed forwardly of the engine compartment 63. The operator's compartment 64 carries a seat 65 and a steering wheel 66.

The loader 61 comprises a boom 67, a boom ram 68, a bucket carrier 69, a digging bucket 70 and certain linkage means. The linkage means comprises a reciprocating hydraulic ram 72, a lever assembly 73 and links 74 and 75.

The boom 67 and the boom ram 68 are formed in duplicate portions disposed one on each side of the tractor 10. One end of each portion of the boom 67 is pivotally connected to the tractor 60 by a bracket 77 and pin means 78. The brackets 77 are secured one on each side of the tractor 60 substantially at the upper forward end of the operator's compartment 64. The other end of the boom 67 extends forwardly of the tractor 60. The rod end of each hydraulic ram 68 is pivotally connected to one of the boom portions intermediate the ends thereof by pin means 79. The head end of each hydraulic ram 68 is pivotally connected to the tractor 60 by pin means 80. Thus it may be seen that as the hydraulic ram 68 is extended the forward end of the boom 67 is raised and as the ram is retracted, the boom 67 is lowered.

The bucket carrier 69 is generally L-shaped and is constructed of a number of members which form a substantially open frame. The bucket carrier 69 need not have the particular frame construction hereinafter described but may be made in other forms suitable for the necessary functions thereof. The bucket carrier 69 comprises a pair of frame members 81 and brace members 82 and 83. The frame members 81 are secured in a spaced apart relationship to each other by the brace members 82 and 83 which extend therebetween as may be seen in FIGURE 7. The frame members 81 are generally L-shaped when viewed in side elevation as in FIGURE 6, and in plan as in FIGURE 7. The brace member 82 is substantially L-shaped and is secured between the upper ends of the frame members 81. The brace member 83 is secured between the horizontally extending arm portions of the frame members 81. Each portion of the boom 67 is pivotally connected to the bucket carrier 69 by pin means 84. Pin means 84 is carried through a suitable opening in the forward end of each portion of the boom 67 and through a suitable opening formed through each frame member 81 of the carrier 69 substantially vertically midway of the upstanding portions of the frame members 81. The forward ends of the frame members 81 of the bucket carrier 69 are spaced apart a distance sufficient to receive the bucket 70 therebetween and include pin means 85 for pivotally connecting the bucket 70 to the forward end of the bucket carrier 69.

The bucket 70 may be of any suitable construction known in the art and comprises a pair of spaced apart sidewalls 86 interconnected by a curved plate 87 which forms the upper, rear, and bottom walls of the bucket 70. The forward marginal edge of the bottom wall of the bucket 70 carries a cutting edge 88. The curvature of the plate 87 substantially conforms to that of the bucket carrier 69 so that the bucket may be received on the carrier in a secure supporting relationship. The bucket 70 is pivotally connected immediately rearwardly of the cutting edge 88 to the bucket carrier 69 by pin means 85.

The linkage means which control both the pivotal position of the bucket carrier 69 relative to the boom 67 and the pivotal position of the bucket 70 relative to the carrier 69 is operated by the hydraulic ram 72. The hydraulic ram 72 is commonly called the bucket tilting ram. The head end of the bucket tilting ram 72 is pivotally connected to a pair of flanges 90 by pin means 91. The flanges 90 are secured to a forwardly and downwardly sloping plate forming the upper forward end of the tractor 60. The flanges 90 are positioned on that plate to carry the pin means 91 substantially horizontally forwardly of pin means 78. The rod end of the bucket tilting ram 72 is pivotally connected to the lever assembly 73.

The lever assembly 73 comprises a cylindrical member 92, a lever arm 93, a lever arm 94 and a pair of lever arms 95. The cylindrical member 92 is pivotally carried intermediate the ends of the boom 67 and between the two portions of the boom 67 by pin means 96. The lever arm 93 is secured by any means such as welding to the cylindrical member 92 to extend radially outwardly from the cylindrical member 92 substantially midway between the ends of the cylindrical member 92. The extending end of the lever arm 93 is pivotally connected to the rod end of the bucket tilting hydraulic ram 72 by pin means 97. Thus it may be seen that the lever arm 93 extends in a generally upward direction when the boom is in its lowered position such as shown in FIGURE 6. The other lever arms 94 and 95 are secured by any means such as welding to the cylindrical member 92 to extend radially outwardly therefrom substantially in the opposite direction from the lever arm 93. Lever arm 94 is further positioned substantially midway of the ends of the cylindrical member 92 and the pair of lever arms 95 are positioned one at each end of the cylindrical member 92. Thus it may be seen that when the bucket tilting ram 72 is extended, the lever arms 94 and 95 are pivoted in a clockwise direction as viewed in FIGURE 6, and when that ram is retracted, the lever arms 94 and 95 are pivoted in a counterclockwise direction.

The lower extending end of the lever arm 94 is pivotally connected to one end of the link 74 by pin means 100 and the other end of the link 74 is pivotally connected to a pair of flanges 98 by pin means 99. The pair of flanges 98 are secured to the bucket carrier 69 above pin means 84. The flanges 98 are further positioned on the brace member 82 substantially at the longitudinal center thereof as may be seen in FIGURE 7.

The lower extending end of each of the lever arms 95 is pivotally connected to one end of one of the links 75 by pin means 101. The other end of each link 75 is pivotally connected between a pair of flanges 102 by pin means 103. Each pair of flanges 102 is secured to the underside of the bottom wall of the bucket 70 by any means such as welding.

The various members of the linkage means are of such a size and so relatively positioned that when the boom 67 is in its lowermost position such as shown in FIGURE 6 and the bucket tilting ram 72 is short of completely extended, the bucket carrier 69 will be positioned with the forwardly extending portion thereof substantially horizontal and the bucket 70 will securely engage the bucket carrier 69. The bucket 70 is then positioned in the ground level digging position of FIGURE 6. If the boom 67 is then raised to the high lift position shown in FIGURE 8 and if the bucket tilting ram 72 is completely extended, the open side of the bucket is disposed substantially upwardly as shown in FIGURE 8. If the bucket tilting ram 72 is then partially retracted, the lever assembly 73 will be pivoted some amount in a counterclockwise direction as viewed in the drawings. This pivoting of the lever assembly 73 will, through the links 74 and 75, cause a clockwise pivoting of the bucket carrier 69 relative to the boom 67 and a clockwise pivoting of the bucket 70 relative to the bucket carrier 69 to a position such as shown in FIGURE 9. From a comparison of FIGURES 6 and 9 wherein the bucket tilting ram 72 is operated to substantially the same extent it may be noted that the bottom wall of the bucket 70 is substantially horizontal in FIGURE 9 as is the bottom wall of the bucket 70 in FIGURE 6. This explains the necessity for completely extending the hydraulic ram 72 upon raising the boom 67 to achieve the bucket position shown in FIGURE 8.

FIGURE 10 shows the substantially complete overturning of the bucket to the high lift dump position resulting from a substantially complete retraction of the bucket tilting ram 72. The forwardly extending portion of the bucket carrier is then disposed substantially horizontally and the bucket 70 is disposed substantially downwardly in the dump position. The excellent bucket attitude in the high lift dumped position is a result of the contemporaneous pivoting of both the bucket 70 and the bucket carrier 69 in the same direction by the operation of the bucket tilting ram 72.

If from the high lift dumped position of FIGURE 10 the bucket tilting ram 72 is partially extended to the position of FIGURE 9, the boom 67 may be lowered and the bucket 70 will be automatically returned to the ground level digging position shown in FIGURE 6 when the boom 67 reached its lowermost position.

Correspondingly with the first embodiment of the invention, it may be seen that in the digging and carrying functions of the second embodiment of the invention, the overall length of the tractor loader is maintained relatively short with the bucket and any load therein being carried close to the forward end of the tractor. Further similarly, it may be seen that the reach of the tractor loader in the high lift dumped position is substantially increased so that dumping into the center or far side of a dump truck or bin is easily accomplished while additionally providing a relatively high dumping height for the bucket.

Although not shown it is intended that suitable hydraulic circuit means including valves, pump and conduit means be provided for selective operation of the various hydraulic rams of both embodiments of the invention under the control of the operator of the tractor loader. The hydraulic circuit means for the rams may be of any suitable constructions known in the art.

Having described the invention what is considered new and desired to be protected by Letters Patent is:

1. In a tractor loader, a boom pivotally connected to said tractor and extending forwardly thereof, means for pivoting said boom to raise the forward end thereof to a high lift position, a bucket having a rear wall curved about an axis disposed transversely of said bucket, a bucket carrier having a rear portion curved to conform to the curvature of said rear wall of said bucket whereby said bucket is receivable in engagement therewith, said carrier further being formed to have a base portion extending below said bucket from said curved rear wall of said bucket to the forward marginal edge of the bottom wall of said bucket, means pivotally connecting the forward marginal edge of said bottom wall of said bucket to the forward end of said base portion of said carrier, means pivotally connecting said curved rear portion of said carrier to the forward end of said boom, linkage means connected between said tractor, said boom, said carrier and said bucket for positioning said bucket with the open side thereof disposed substantially upwardly in the high lift position of said boom, said linkage means including a hydraulic motor for contemporaneously pivoting said carrier relative to said boom and said bucket relative to said carrier to a dumped position in said high lift position of said boom responsive to a certain operation of said hydraulic motor.

2. In a tractor loader, a boom pivotally connected to said tractor and extending forwardly thereof, a bucket having a rear wall curved about an axis disposed transversely of said bucket, a bucket carrier having a rear portion curved to conform to the curvature of said rear wall of said bucket whereby said bucket is receivable in engagement therewith, said carrier further being formed to have a base portion extending below said bucket from said curved rear wall of said bucket to the forward marginal edge of the bottom wall of said bucket, means pivotally connecting the forward marginal edge of said bottom wall of said bucket to the forward end of said base portion of said carrier, means pivotally connecting said curved rear portion of said carrier to the forward end of said boom, linkage means including a hydraulic motor pivotally connected between said tractor, said boom and said carrier for pivoting said carrier relative to said boom responsive to a certain operation of said motor, and means connected to said bucket and cooperating with said linkage means for pivoting said bucket relative to said carrier responsive to said certain operation of said hydraulic motor.

3. In a tractor loader, a boom pivotally connected to said tractor and extending forwardly thereof, means for pivoting said boom to raise the forward end thereof to a high lift position, a bucket having a rear wall curved about an axis disposed transversely of said bucket, a bucket carrier having a rear portion curved to conform to the curvature of said rear wall of said bucket whereby said bucket is receivable in engagement therewith, said carrier further being formed to have a base portion extending below said bucket from said curved rear wall of said bucket to the forward marginal edge of the bottom wall of said bucket, means pivotally connecting the forward marginal edge of said bottom wall of said bucket to the forward end of said base portion of said carrier, means pivotally connecting curved rear portion of said carrier to the forward end of said boom, linkage means pivotally connected between said tractor, said boom and said carrier for positioning said carrier and said bucket with the open side of said bucket disposed substantially upwardly in said high lift boom position, said linkage means including a hydraulic motor for pivoting said carrier relative to said boom to a position to wherein said base portion is substantially horizontally disposed when said boom is in said high lift position responsive to a certain operation of said hydraulic motor, and means connected to the bottom wall of said bucket and cooperating with said linkage means for contemporaneously pivoting said bucket relative to said carrier from said upwardly opening position to a dumped position when said boom is in said high lift position responsive to said certain operation of said hydraulic motor.

4. In a tractor loader, a boom pivotally connected to said tractor and extending forwardly thereof, a bucket carrier pivotally connected to the forward end of said boom, a bucket pivotally connected to said carrier, lever means pivotally connected between said boom and said carrier, a pulley rotatively carried on said carrier substantially above the pivotal connection of said carrier to said boom, a cable connected at one end thereof to said boom intermediate the ends thereof and passing over said pulley to a connection with said bucket, a hydraulic motor pivotally connected between said tractor and said lever means, said lever means, said pulley and said cable being relatively formed and positioned so that said carrier is pivoted relative to said boom and said bucket is contemporaneously pivoted relative to said carrier to a dumped position responsive to a certain operation of said hydraulic motor.

5. In a tractor loader, a boom pivotally connected to said tractor and extending forwardly thereof, a bucket carrier pivotally connected to the forward end of said boom, a bucket, means pivotally connecting the forward marginal edge of the bottom wall of said bucket to the forward end of said carrier, lever means pivotally connected between said boom and said carrier, a pulley rotatively carried on said carrier substantially above the pivotal connection of said carrier to said boom, a cable connected at one end thereof to said boom intermediate the ends thereof and passing over said pulley to a connection on the bottom wall of said bucket, a hydraulic motor pivotally connected between said tractor and said lever means, said lever means, said pulley and said cable being relatively formed and positioned so that said carrier is pivoted relative to said boom and said bucket is contemporaneously pivoted relative to said carrier to a dumped position responsive to a certain operation of said hydraulic motor.

6. In a tractor loader, a boom pivotally connected to said tractor and extending forwardly thereof, means for pivoting said boom to raise the forward end thereof to a high lift position, a bucket carrier pivotally connected to the forward end of said boom, a bucket pivotally connected to said carrier, linkage means connected between said tractor, said boom, said carrier and said bucket for positioning said bucket with the open side thereof disposed substantially upwardly in the high lift position of said boom, said linkage means including a pulley and a cable, said pulley rotatively carried on said carrier substantially above the pivotal connection of said carrier to said boom, said cable connected at one end thereof to said boom intermediate the ends thereof and passing over said pulley to a connection with said bucket, said pulley and said cable being relatively formed and positioned so that said carrier is pivoted relative to said boom and said bucket is contemporaneously pivoted relative to said carrier to a dumped position in said high lift position of said boom responsive to a certain operation of said linkage means.

7. In a tractor loader, a boom pivotally connected to said tractor and extending forwardly thereof, a bucket carrier pivotally connected to the forward end of said boom, a bucket pivotally connected to said carrier, lever means pivotally carried on said boom and connected to said carrier and said bucket, a hydraulic ram pivotally connected between said tractor and said lever means, said lever means being formed so that said carrier is pivoted relative to said boom and said bucket is contemporaneously pivoted relative to said carrier to a dumped position responsive to a certain operation of said hydraulic motor.

8. In a tractor loader, a boom pivotally connected to said tractor and extending forwardly thereof, a bucket carrier pivotally connected to the forward end of said boom, a bucket, means pivotally connecting the forward marginal edge of the bottom wall of said bucket to the forward end of said carrier, lever means pivotally carried on said boom and pivotally connected to said carrier and to said bucket, a hydraulic ram pivotally connected between said boom and said lever means, said lever means being formed so that said carrier is pivoted relative to said boom and said bucket is contemporaneously pivoted relative to said carrier to a dumped position responsive to a certain operation of said hydraulic motor.

9. In a tractor loader, a boom pivotally connected to said tractor and extending forwardly thereof, means for pivoting said boom to raise the forward end thereof to a high lift position, a bucket carrier pivotally connected to the forward end of said boom, a bucket pivotally connected to said carrier, linkage means connected between said tractor, said boom, said carrier and said bucket for positioning said bucket with the open side thereof disposed substantially upwardly in the high lift position of said boom, said linkage means including a lever assembly and a pair of links, one of said links pivotally connected between said lever assembly and said carrier, the other of said links pivotally connected between said lever assembly and said bucket, said lever assembly and said pair of links being relatively formed so that said carrier is pivoted relative to said boom and said bucket is contemporaneously pivoted relative to said carrier to a dumped position in said high lift position of said boom responsive to a certain pivoting of said lever assembly.

10. In tractor loader, a boom pivotally connected to said tractor and extending forwardly thereof, a bucket carrier pivotally mounted on said boom, a bucket pivotally mounted on said carrier, a link pivotally secured to said boom, ram means connected between said tractor and said link whereby extension and retraction of said ram means will pivot said link relative to said boom, linkage means connected to said link and said carrier for pivoting said carrier relative to said boom in response to pivoting of said link by said ram means, and means connected to said bucket and said boom to pivot said bucket relative to said carrier in response to pivoting of said carrier relative to said boom.

References Cited in the file of this patent

UNITED STATES PATENTS

| | | |
|---|---|---|
| 1,733,969 | Knapp | Oct. 29, 1929 |
| 2,451,101 | Leschinsky | Oct. 12, 1948 |
| 2,457,346 | Carlson et al. | Dec. 28, 1948 |
| 2,773,613 | Burrus | Dec. 11, 1956 |
| 3,038,619 | Wagner | June 12, 1962 |
| 3,047,916 | O'Brien | Aug. 7, 1962 |